US012787900B2

(12) United States Patent
Bechtel

(10) Patent No.: US 12,787,900 B2
(45) Date of Patent: Nov. 10, 2026

(54) GARDENING OR GARDENING OR HUSBANDRY TOOL AND RELATED METHOD

(71) Applicant: Dan Bechtel, Wildomar, CA (US)

(72) Inventor: Dan Bechtel, Wildomar, CA (US)

( * ) Notice: Subject to any disclaimer, the term of this patent is extended or adjusted under 35 U.S.C. 154(b) by 311 days.

(21) Appl. No.: 18/588,619

(22) Filed: Feb. 27, 2024

(65) Prior Publication Data

US 2025/0268115 A1 Aug. 28, 2025

(51) Int. Cl.

*A01B 1/20* (2006.01)
*A01B 1/10* (2006.01)
*A01D 7/02* (2006.01)

(52) U.S. Cl.

CPC .................. *A01B 1/20* (2013.01); *A01B 1/10* (2013.01); *A01D 7/02* (2013.01)

(58) Field of Classification Search

CPC .... A01B 1/10; A01B 1/20; A01D 7/02; A01D 7/06; A01D 7/08; A01D 7/10
USPC ........................................ 172/371, 374, 375
See application file for complete search history.

(56) References Cited

U.S. PATENT DOCUMENTS

| | | | | | |
|---|---|---|---|---|---|
| 1,149,098 | A * | 8/1915 | Tanaka | A01D 7/06 | 56/400.18 |
| 1,469,144 | A * | 9/1923 | Harris | A01B 1/20 | 56/400.06 |
| 1,757,942 | A * | 5/1930 | Geffken | A01B 1/20 | 56/400.05 |
| 4,334,583 | A * | 6/1982 | Parker | A01B 1/20 | 172/380 |
| 5,003,760 | A * | 4/1991 | Webb | A01D 11/06 | 56/400.21 |

* cited by examiner

*Primary Examiner* — Tara Mayo

(74) *Attorney, Agent, or Firm* — Buche Law PC; Bryce A. Johnson; John K. Buche

(57) ABSTRACT

Disclosed is an integrated rake and hoe tool.

1 Claim, 5 Drawing Sheets

GARDENING OR GARDENING OR HUSBANDRY TOOL AND RELATED METHOD

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

The disclosed subject matter is in the field of gardening or gardening or husbandry tools.

Background of the Invention

Thousands of years ago, humans began domesticating animals and cultivating land, leading to the development of various tools to aid in these tasks. Over time, these tools evolved. That said, the fundamental need for efficient, multi-purpose implements has remained constant.

For example, gardeners and husbandry practitioners frequently find themselves switching between a rake and a hoe to accomplish routine tasks. This constant interchange not only interrupts the workflow but also contributes to physical strain and time inefficiency. A need for a dual-functionality tool emerges as a response to the practical challenges faced by such gardeners and husbandry practitioners.

SUMMARY OF THE INVENTION

The gardening or husbandry tool 1000 combines the functionalities of a rake and a hoe into a single, versatile tool. This innovative design addresses the need for a more efficient and ergonomic solution for various tasks in gardening, farming, and land management. The gardening or husbandry tool 1000 is defined by two main components: the rake-part 1100 and the hoe-part 1200. The rake-part 1100 features outward-fanning rake tines 1110, designed for gathering, leveling, and aerating soil or mulch. The hoe-part 1200, equipped with cutting blades 1210, serves as a robust tool for cutting, digging, and lightwork-hoeing, particularly useful for breaking up hardened soil or cutting through small roots and non-wooded weeds.

A unique aspect of the tool 1000 is the integration of these two parts, allowing the tool to be used as a traditional rake when operated in a forward-to-backward motion and as a hoe or machete when operated side-to-side. This dual functionality not only enhances the tool's versatility but also reduces the need for multiple separate tools, making gardening and farming tasks more efficient and less physically demanding. The integration of the rake and hoe functionalities into a single tool represents a significant innovation in gardening and agricultural tools. By enabling users to seamlessly transition between raking and hoeing without the need to switch tools, the husbandry tool 1000 significantly enhances operational efficiency. This not only saves time but also reduces the physical burden on the user, thereby improving the overall gardening and land management experience.

BRIEF DESCRIPTION OF THE VIEWS OF THE DRAWINGS

Other objectives of the disclosure will become apparent to those skilled in the art once the invention has been shown and described. The way these objectives and other desirable characteristics can be obtained is explained in the following description and attached figures in which.

DETAILED DESCRIPTION OF PROFFERED EMBODIMENTS

Disclosed is an integration of rake and hoe or machete functionalities into a single tool. Generally, the disclosed gardening or husbandry tool is defined by a rake with tines that fan outward so that the tool can be used as a rake when the tool 1000 is operated forward-to-backward and thicker side tines 1210 that can be used as a hoe or machete blades when the tool is operated side-to-side. The more specific details of the disclosure are described in connection with the figures.

Figure 1:
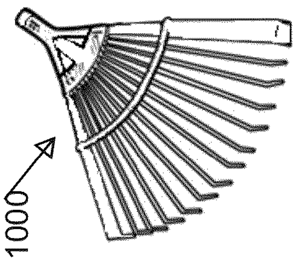
FIG. 1 is a perspective view of an improved gardening or husbandry tool 1000 defined by a rake-part 1100 with rake tines 1110 and a hoe-part 1200 with cutting blades 1210 such that when the two parts 1100, 1200 are coupled, the gardening or husbandry tool 1000 is defined by a rake with tines 1110, 1210 that fan outward so that the tool 1000 can be used as a rake when the tool 1000 is operated forward-to-backward and thicker side tines 1210 that can be used as a hoe or machete blades when the tool is operated side-to-side.
Figure 2:
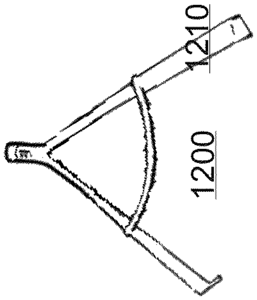
FIG. 2 is a perspective view of the hoe-part 1200 of the gardening or husbandry tool 1000.
Figure 3:
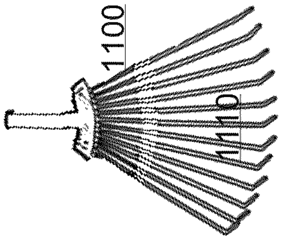
FIG. 3 is a perspective view of the rake part of the gardening or husbandry tool 1000.

FIG. 1 is a perspective view of an improved gardening or husbandry tool 1000 defined by a rake-part 1100 with rake tines 1110 and a hoe-part 1200 with cutting blades 1210. FIG. 2 is a perspective view of the hoe-part 1200 of the gardening or husbandry tool 1000. FIG. 3 is a perspective view of the rake part of the gardening or husbandry tool 1000.

Figure 4:
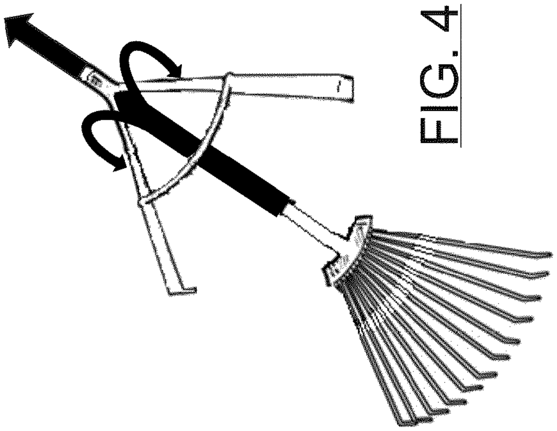
FIG. 4 is an exploded view of the gardening or husbandry tool 1000 that depicts coupling of the hoe-part 1200 and the rake part 1100 of the tool 1000.

Referring to FIG. 2, the hoe-part 1200 is defined by an A-frame. In a preferred embodiment, the A-Frame features a socket 1220 at the top and is constructed such that the legs of the A-frame define blades 1210 of a hoe or machete or else two outer tines of a rake. As discussed later in connection with FIG. 4, the cross-bar of the A-frame provides a rigid backing or back bone for the tines 1110 of the rake part 1100 (See FIG. 1 or 4).

Referring to FIG. 3, the rake-part 1100 is defined by an upside down T-frame. In a preferred embodiment, the upside down T-frame features a stem 1120 at the top and is constructed such that the legs of the crossbar of the T-frame define catches 1230 for the coupling to the A-Frame of the hoe-part 1200 (See FIG. 4). Suitably, the cross bar of the T-frame features protruding tines 1110 of a rake.

The development of the gardening or husbandry tool 1000 involved careful consideration of ergonomics, durability, and functionality. The exploded view (FIG. 4) demonstrates the thoughtful design of the coupling mechanism between the rake-part 1100 and the hoe-part 1200, ensuring a secure and seamless transition between functions. As shown, the crossbar of the A-frame provides a rigid backing or back bone for the tines 1110 of the rake part 1100 and the catches 1230 of the T-frame secure the two frames in a braided or weaved configuration. Specifically, the stem of the t-frame is provided under the crossbar of the A frame and plugged into the socket of the A-frame while the catches of the T frame are provided over the legs of the A frame and while the tines are positioned under the cross-bar of the A-frame.

Figure 5:
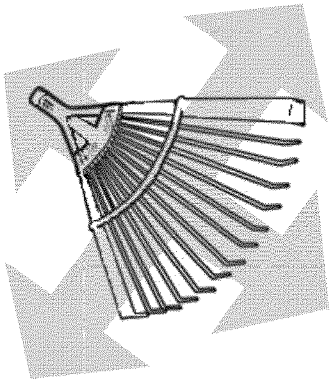
FIG. 5 is an environmental tool that shows the tool 1000 being operated in a forward to backward or side-to-side manner.

The gardening or husbandry tool 1000 stands as a testament to the evolution of agricultural tools, reflecting both a deep respect for the traditions of animal husbandry and a forward-looking approach to tool design. FIG. 5 shows that, by combining the functionalities of a rake and a hoe, the tool 1000 offers a versatile solution that addresses the multifaceted demands of contemporary gardening, farming, and land management. As shown, the improved gardening or husbandry tool 1000 is defined by a rake-part 1100 with rake tines 1110 and a hoe-part 1200 with cutting blades 1210 such that when the two parts 1100, 1200 are coupled, the gardening or husbandry tool 1000 is defined by a rake with tines 1110, 1210 that fan outward so that the tool 1000 can be used as a rake when the tool 1000 is operated forward-to-backward and thicker side tines 1210 that can be used as a hoe or machete blades when the tool is operated side-to-side.

A purpose of the improved husbandry tool, designated as tool 1000, is to provide a versatile and efficient implement for various agricultural and gardening tasks. This tool combines the functionalities of a rake and a hoe into a single device, enhancing the convenience and effectiveness of land management practices. The rake-part 1100, with its outward-fanning rake tines 1110, is designed for tasks such as gathering, leveling, and aerating soil or mulch. This part of the tool is used when the tool is operated in a forward-to-backward motion, functioning as a traditional rake. The hoe-part 1200, featuring thicker cutting blades 1210, is intended for more robust activities such as cutting, digging, and hoeing. This part is particularly useful for breaking up hard soil or cutting through small roots and non-wooded weeds. When the tool is operated side-to-side, these thicker side tines can be used as a hoe or machete blades. By integrating these two parts, the husbandry tool 1000 allows users to switch between raking and hoeing functions without the need to change tools, thereby saving time and reducing the physical strain associated with carrying and switching between multiple implements. This multifunctional design aims to improve the efficiency of agricultural operations and support the day-to-day care, management, and cultivation of land.

The preferred design of the tool 1000 (FIG. 6) showcases an optimized form that balances weight, strength, and ease of use. This design is the culmination of extensive research and testing, aimed at providing users with a high-quality, durable tool that meets the diverse needs of modern husbandry and gardening practices.

Figure 7:
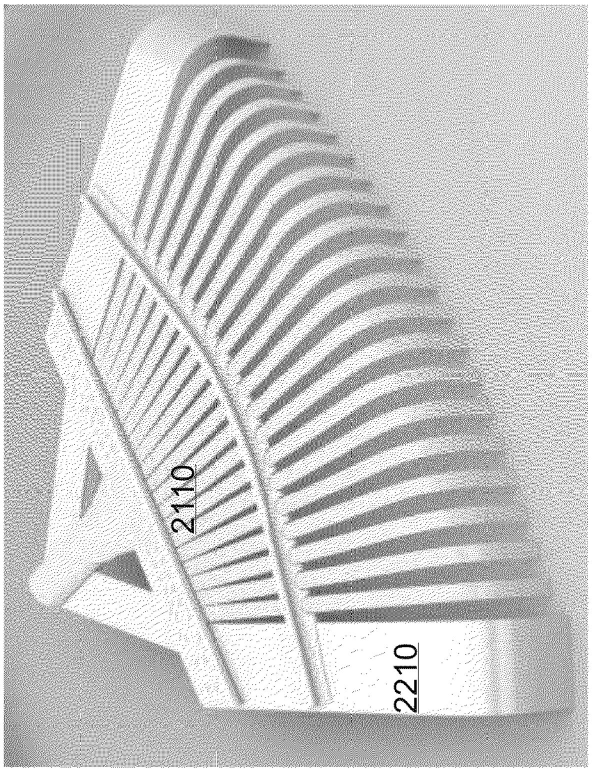
FIG. 7 is a perspective view of another embodiment of an improved gardening or husbandry tool 2000.
Figure 8:
FIG. 8 is a perspective view of the other embodiment of the tool 2000 with a handle installed.
Figure 9:
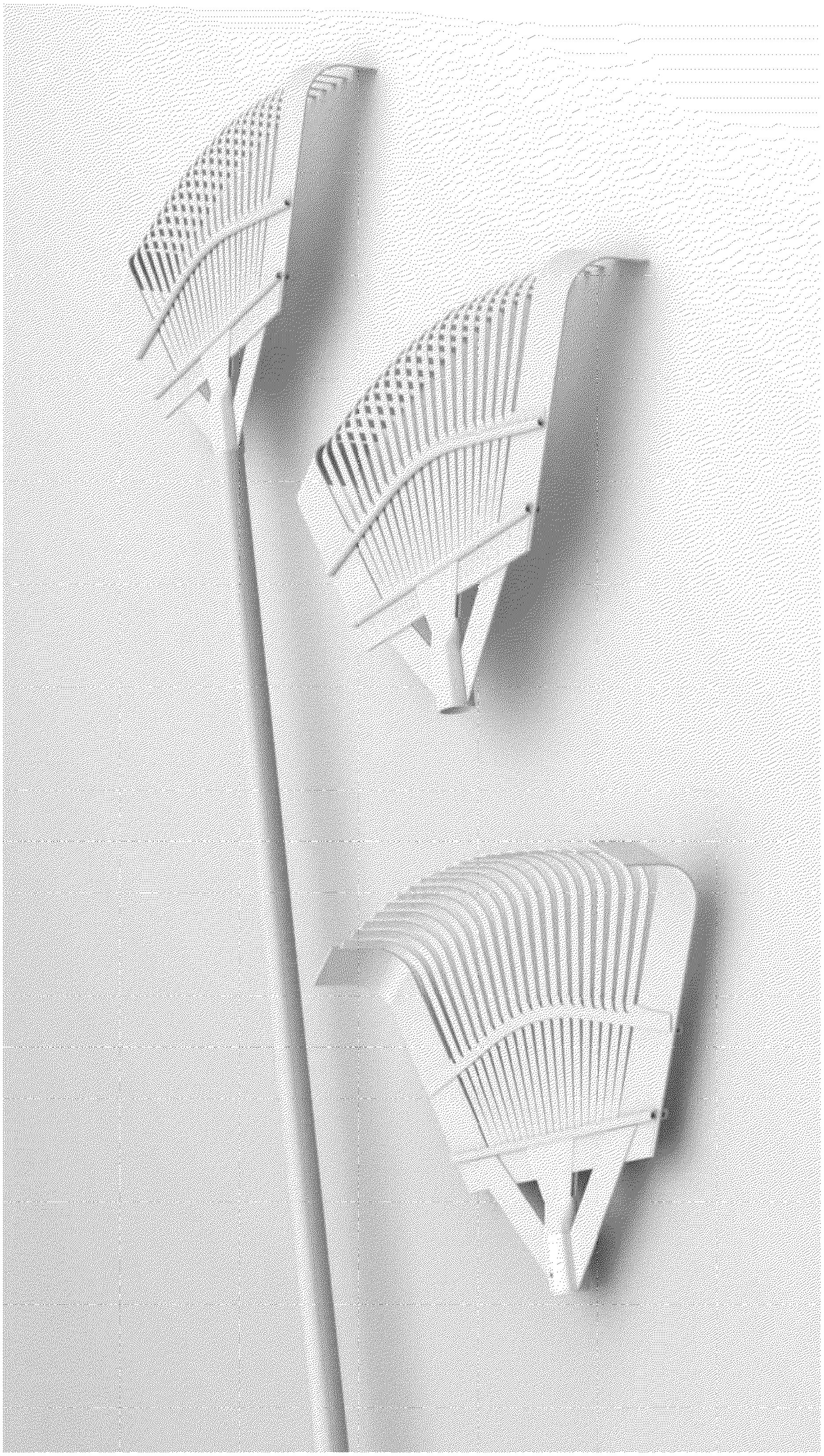
FIG. 9 is a perspective view of the tool 2000 with a handle installed along with side-by-side views of the bottom and top of perspective views of the alternative embodiment 2000 of the tool; and, FIG. 10 is a zoomed in view of the underside of the tool 2000 and the underside thereof. It is to be noted, however, that the appended figures illustrate only typical embodiments of this invention and are therefore not to be considered limiting of its scope, for the invention may admit to other equally effective embodiments that will be appreciated by those skilled in the relevant arts. Also, figures are not necessarily made to scale but are representative.
Figure 10:
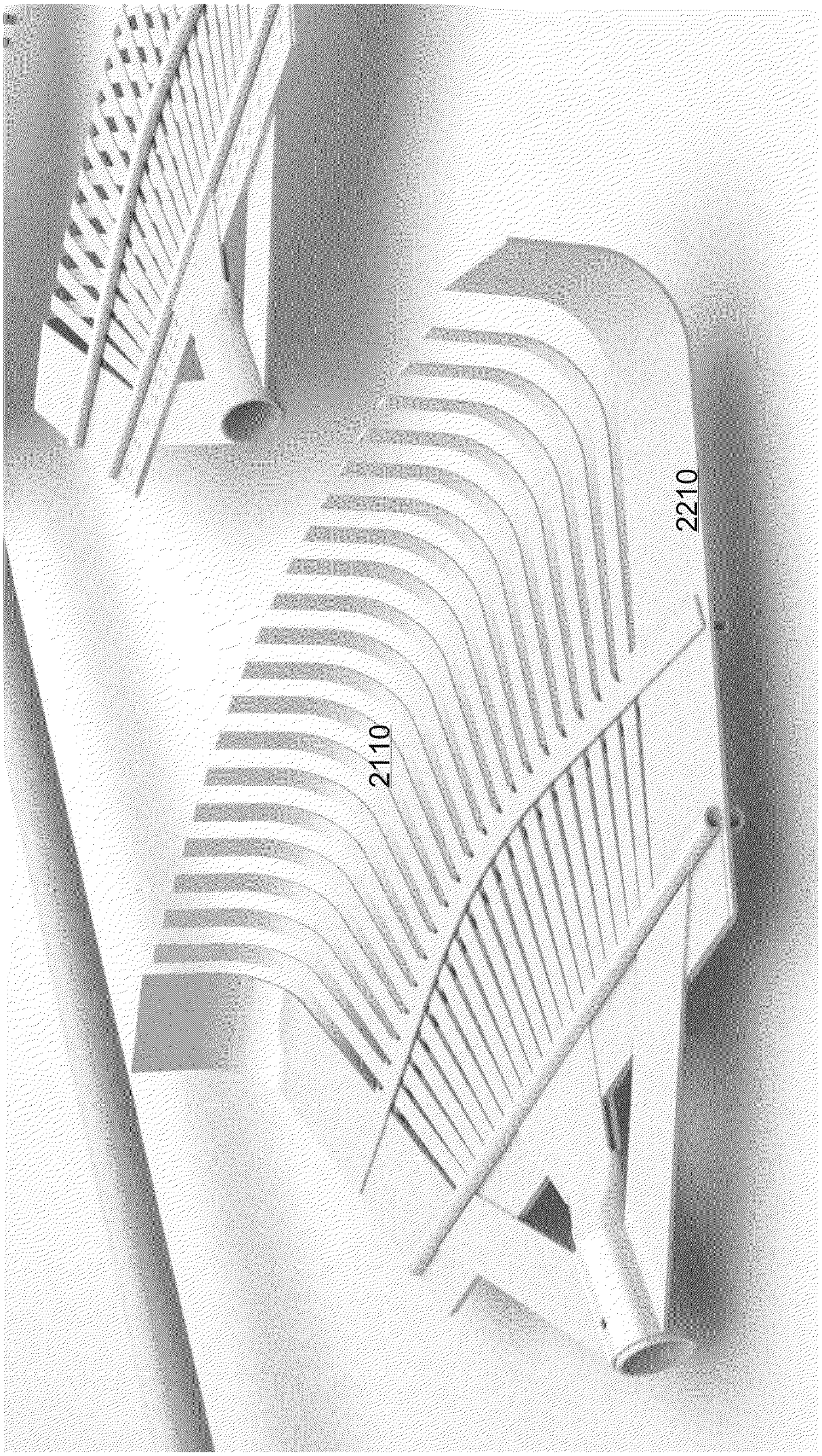

FIG. 7 is a perspective view of an improved gardening or husbandry tool 2000 defined by rake tines 2110 and cutting blades 2210. FIG. 8 is a perspective view of the other embodiment of the tool 2000 with a handle installed. FIG. 9 is a perspective view of the tool 2000 with a handle installed along with side-by-side views of the bottom and top of perspective views of the alternative embodiment 2000 of the tool. FIG. 10 is a zoomed in view of the underside of the tool 2000 and the underside thereof. As shown in these figures the alternative embodiment of the tool 2000 operates in the same manner as the earlier described embodiment of the tool 1000.

Figure 6:
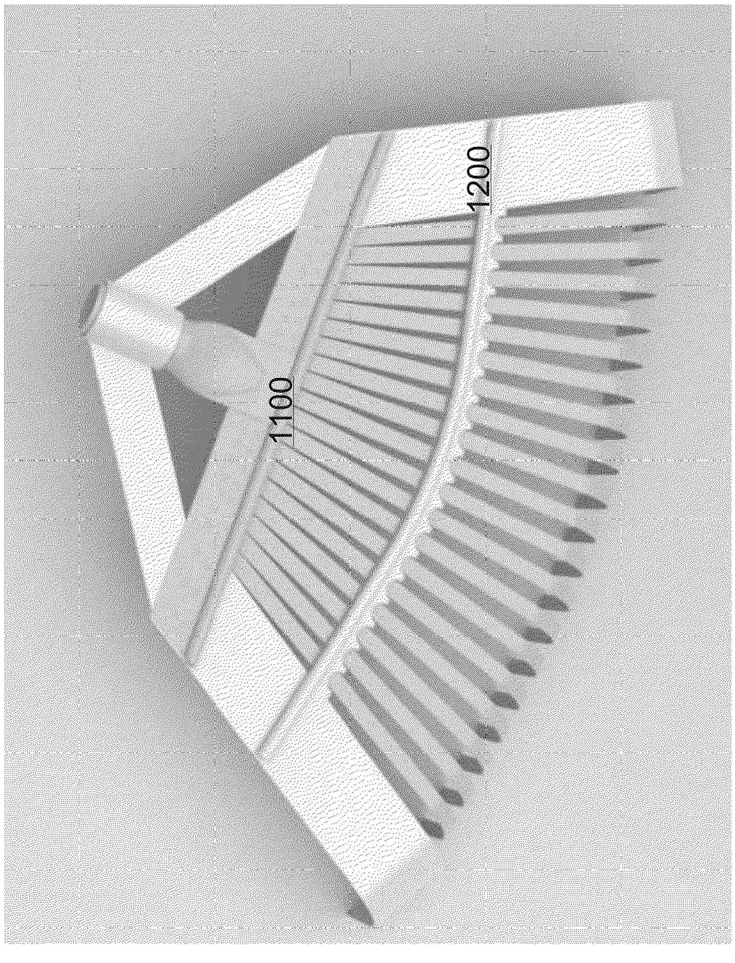
FIG. 6 is a perspective view of a preferred design of the tool 1000.

As compared to the earlier embodiment 1000 depicted in FIG. 6, the alternative embodiment 2000 of FIGS. 7-10 features several different structural configurations. One difference could be that the alternative embodiment 2000 has a single piece neck support that is defined by folded sheet metal while the earlier embodiment 1000 of the tool of FIG. 6 features a three-piece neck support defined by rivetted sheet metal. Moreover, what was considered a rake part 1100 and a hoe part 1200 of the earlier embodiment are formed as a single unit with dimple welds and/or rivets connecting the two parts together. Other embodiments include screws connecting the portions together as dimple welds can be or become weak.

Although the method and apparatus is described above in terms of various exemplary embodiments and implementations, it should be understood that the various features, aspects, and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus, the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like; the term "example" is used to provide exemplary instances of the item in discussion, not an exhaustive or limiting list thereof;

the terms “a” or “an” should be read as meaning “at least one,” “one or more,” or the like; and adjectives such as “conventional,” “traditional,” “normal,” “standard,” “known,” and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as “one or more,” “at least,” “but not limited to,” or other like phrases in some instances shall not be read to mean that the narrower case is intended or required in instances where such broadening phrases might be absent. The use of the term “assembly” does not imply that the components or functionality described or claimed as part of the module are all configured in a common package. Indeed, any or all the various components of a module, whether control logic or other components, might be combined in a single package or separately maintained and might further be distributed across multiple locations.

Additionally, the various embodiments set forth herein are described in terms of exemplary block diagrams, flow charts, and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

I claim:

1. A gardening or husbandry tool (1000) defined by two main components:

(a) a rake-part (1100) and (b) a hoe-part (1200, wherein the rake-part (1100) features outward-fanning rake tines (1110), designed for gathering, leveling, and aerating soil or mulch, wherein the hoe-part (1200) is equipped with cutting blades 1210) for cutting, digging, and hoeing;

wherein said hoe-part (1200) is defined by an A-frame structure having a socket (1220) at a top portion, a pair of legs extending from the top portion to define a pair of outer cutting blades (1210), and a structural cross-bar connecting the pair of legs;

wherein the rake-part (1100) is defined by an upside-down T-frame structure having a stem (1120) at a top portion and a crossbar featuring a plurality of outward-fanning, protruding rake tines (1110) and a pair of catches (1230) located at distal ends of the crossbar;

wherein the rake-part (1100) and the hoe-part (1200) are detachably secured together in an interlocking woven configuration such that:

the stem (1120) of the T-frame structure is positioned underneath the structural cross-bar of the A-frame structure and plugged into the socket (1220);

the pair of catches (1230) of the T-frame structure are hooked over the legs of the A-frame structure; and the plurality of protruding rake tines (1110) are positioned underneath the structural cross-bar of the A-frame structure, whereby the structural cross-bar provides a rigid structural backbone supporting the rake tines (1110).

* * * * *